United States Patent [19]

Arthur et al.

[11] Patent Number: 4,749,488

[45] Date of Patent: Jun. 7, 1988

[54] MULTILAYER REVERSE OSMOSIS MEMBRANE IN WHICH ONE LAYER IS POLY-META-PHENYLENE TETRAHYDROFURAN-2,3,4,5-TETRACARBOXAMIDE

[75] Inventors: Samuel D. Arthur; Sherman A. Sundet, both of Wilmington, Del.

[73] Assignee: E. I. Du Pont De Nemours and Company, Wilmington, Del.

[21] Appl. No.: 105,695

[22] Filed: Oct. 8, 1987

[51] Int. Cl.$^4$ ............................................. B01D 13/00
[52] U.S. Cl. ............................ 210/490; 210/500.38; 210/654; 528/353
[58] Field of Search ............... 210/490, 500.38, 654; 528/353

[56] References Cited

U.S. PATENT DOCUMENTS

| | | | |
|---|---|---|---|
| 3,567,632 | 3/1971 | Richter et al. | 210/500.38 |
| 3,649,687 | 3/1972 | Weyland et al. | 260/544 L |
| 3,730,941 | 5/1973 | Alvino | 528/353 |
| 3,744,642 | 7/1973 | Scala et al. | 210/500.41 |
| 4,142,020 | 2/1979 | Okamura et al. | 210/500.38 |
| 4,277,344 | 7/1981 | Cadotte | 210/490 |
| 4,353,802 | 10/1982 | Hara et al. | 210/654 |
| 4,643,829 | 2/1987 | Sundet | 210/500.38 |

FOREIGN PATENT DOCUMENTS 0176992  4/1986  European Pat. Off. ........ 210/500.38

*Primary Examiner*—Richard V. Fisher
*Assistant Examiner*—Coreen Y. Lee

[57] ABSTRACT

A multilayer membrane for performing reverse osmosis is disclosed. The membrane comprises a porous support and interfacially polymerized thereon a superposed layer of poly meta-phenylene tetrahydrofuran-2,3,4,5-tetracarboxamide in which up to 50 mole % of the tetrahydrofuran-2,3,4,5-tetracarboxamide units have been replaced with isophthalamide or terephthalamide units. The preferred material for forming the support is a polysulfone.

5 Claims, No Drawings

MULTILAYER REVERSE OSMOSIS MEMBRANE IN WHICH ONE LAYER IS POLY-META-PHENYLENE TETRAHYDROFURAN-2,3,4,5-TETRACARBOXAMIDE

BACKGROUND OF THE INVENTION

1. Field of the Invention

This invention relates to a composite membrane suitable for use in reverse osmosis processes such as for the desalination of aqueous solutions. More particularly this invention relates to a multilayer membrane in which one layer is poly-meta-phenylene tetrahydrofuran-2,3,4,5-tetracarboxamide, and one layer is a microporous support layer.

2. Prior Art

Permselective membranes suitable for use in desalination of aqueous solutions are the subject of numerous patents. Richter et al. U.S. Pat. No. 3,567,632 discloses membranes made of organic, nitrogen linked aromatic polymers. Cadotte U.S. Pat. No. 4,277,344 discloses permselective multi-layer membranes in which there is a microporous polysulfone substrate layer and a superposed polyamide layer made from an aromatic triacid halide and an aromatic diamine. Scala et al. U.S. Pat. No. 3,744,642 discloses multilayer membranes in which one layer is porous substrate and the juxtaposed layer is a polyamide, a polyphenylester, or a polysulfonamide. Weyland et al. U.S. Pat. No. 3,649,687 discloses the use of 1,3,5-cyclohexane tricarbonyl chloride in the production of cross linking agent: 1,3,5-cyclohexane triisocyanate. Hara et al. U.S. Pat. No. 4,353,802 discloses semipermeable composite membranes in which the membrane material is cross-linked using polyfunctional aromatic acid halides. Sundet U.S. Pat. No. 4,643,829 discloses semipermeable composite membranes in which there is a microporous polysulfone layer and a superposed polyamide layer made from interfacially polymerized poly-meta-phenylene cyclohexane-1,3,5-tricarboxamide.

SUMMARY OF THE INVENTION

The present invention is a multilayer membrane comprising a microporous support layer and a superposed layer of poly-meta-phenylene tetrahydrofuran-2,3,4,5-tetracarboxamide. In a preferred embodiment the microporous substrate is a polysulfone, and the pore size of the polysulfone is less than about 20 nanometers in diameter.

A convenient method of preparation of the membrane of the invention is by interfacial condensation polymerization, i.e., contacting the polysulfone substrate with a solution of meta-phenylene diamine to impregnate the polysulfone substrate, and then contacting the impregnated polysulfone substrate with a solution of tetrahydrofuran-2,3,4,5-tetracarbonyl chloride. This method yields very thin films since the reaction is diffusion controlled and self-limiting.

In the membranes of this invention the microporous substrate will normally be about 0.5 to 5 mils (1.25×10$^{-5}$ to 1.25×10$^{-4}$m) thick and the polyamide layer will normally be about 20 to 200 nanometers thick.

DETAILED DESCRIPTION

The procedures of Cadotte U.S. Pat. No. 4,277,344 and Sundet U.S. Pat. No. 4,643,829 are illustrative of the conditions needed for preparing composite membranes. The process consists essentially of the following steps.

A microporous substrate with pores less than 20 nm in diameter is prepared. This may be accomplished with a polysulfone, cast from a 15–20% solution in a solvent such as dimethylformamide and immediately quenched in water to precipitate the polysulfone and extract the solvent. Optionally the polysulfone can be cast on a further support such as a woven polyester sail cloth.

This substrate (dried or wet and stored, or fresh and wet) is then loaded with an aqueous solution of meta-phenylenediamine at a concentration of 1 to 10%, preferably 1 to 3% and the excess removed by a draining, rolling or sponging procedure. The concentration of the diamine is an important factor in the performance of the resulting composite.

If desired the cast polysulfone can be quenched in an aqueous solution containing 0.1–10% by weight, preferably 0.5–5% by weight and most preferably 1–3% by weight phenylene diamine.

The loaded substrate is then immersed in a solution of 0.01 to 0.5 wt % tetrahydrofuran-2,3,4,5-tetracarbonyl chloride in a solvent which is immiscible with water such as Freon® TF chlorofluorocarbon liquid or hexane or mixtures thereof (solvents which do not adversely affect the structure of the polysulfone substrate) for 5–90, preferably 15–35 seconds at room temperature. Formation of the polyamide causes the original shiny substrate to have a dull finish. Alternatively, up to 50% and preferably 25 to 50 wt % of the tetrahydrofuran-2,3,4,5-tetracarbonyl chloride can be replaced with isophthaloyl chloride, terephthaloyl chloride or mixtures thereof. The resulting composite is then dried at temperatures of 25°–60° C., preferably 25°–35° C., for periods of 5–120 minutes.

The residual diamine and reaction byproducts are extracted by soaking in water.

EXAMPLES

Membrane Testing

The test results shown in the examples were all obtained at 420 psig (2.9 KPa). The permeation properties of the membranes were all determined after at least 17 hours of testing. The feed in all cases was aqueous 0.20–0.25% NaCl. The permeation cells were of a crossflow design in which each membrane sample was exposed to 0.75 l/min feed. Conversion was typically less than 2%; conversion is expressed as volume of permeate per unit time divided by volume of feed per unit time. The permeation results are expressed as fraction of NaCl rejected (R) and flux (Kw).

$R = 1 - Cp/Cf$ where Cp and Cf are the concentrations of NaCl in the permeate and feed, respectively.

Kw=Flux/Effective pressure, expressed in units of meters per second per TeraPascal (m s$^{-1}$ TPa$^{-1}$), where flux is the flow rate through the membrane and the effective pressure is equal to the feed pressure minus the opposing osmotic pressure. In the Examples, flux is also expressed in terms of permeate productivity (GFD, gal/ft2/day) at 420 psig (2.9KPa).

Support Membrane

A microporous polysulfone substrate was prepared from a 17% solution of polysulfone derived from bisphenol A and p,p'-dichlorodiphenyl sulfone (UDEL P3500) in N,N-dimethylformamide which contained 0.3% water. The solution was cast onto a woven polyester sail cloth web (TEXLON ®) at a knife clearance of 5.5 mils (14×10$^{-5}$m). The web was immersed in a water quench bath within 10 seconds of casting. The substrate was washed to remove dimethylformamide and was stored damp until used.

EXAMPLES 1–8

The microporous polysulfone substrate was immersed in an aqueous solution of metaphenylenediamine (MPD) of indicated concentration for the time indicated. The substrate was removed from the MPD solution and excess beads of solution were removed from the surface of the substrate via a soft rubber roller or a rubber squeegee. The wet MPD-impregnated substrate was then immersed in a solution of tetrahydrofuran-2,3,4,5-tetracarbonyl chloride (THFTCC) of indicated concentration in FREON TF solvent (1,1,2-trichlorotrifluoroethane) for the time reported in Table 1. The FREON TF typically contained 0.1–1% dichloromethane to help THFTCC solubility. The membrane was removed from the solution and allowed to drip dry in still air at room temperature for one to two hours. The membrane was extracted with 55° C. tap water for 5 minutes and then was allowed to stand in deionized water overnight before testing. Examples 1–8 are reported in Table 1.

TABLE 1

| EXAMPLE NO. | MPD CONC (%) | MPD EXPOSURE TIME (min) | THFTCC CONC (w/v %) | THFTCC EXPOSURE TIME (sec) | SALT REJECTION | FLUX (Kw) | GFD (GAL/FT2/DAY) AT 420 psig |
|---|---|---|---|---|---|---|---|
| 1 | 1.0 | 5 | 0.270 | 15 | 0.9713 | 5.74 | 35.1 |
| 2 | 3.0 | 1 | 0.042 | 15 | 0.9586 | 6.88 | 35.1 |
| 3 | 1.0 | 1 | 0.062 | 15 | 0.9532 | 7.26 | 38.4 |
| 4 | 3.0 | 5 | 0.153 | 45 | 0.9755 | 4.72 | 27.2 |
| 5 | 3.0 | 4 | 0.360 | 15 | 0.9740 | 1.97 | 13.2 |
| 6 | 2.5 | 4 | 0.130 | 35 | 0.9601 | 5.12 | 33.8 |
| 7 | 2.5 | 4 | 0.180 | 35 | 0.9816 | 3.16 | 20.8 |
| 8 | 1.5 | 4 | 0.104 | 25 | 0.9810 | 3.11 | 20.0 |

Test Conditions: 0.2% NaCl feed @ 420 psig

EXAMPLES 9 AND 10

The effect of solvent other than FREON TF, namely hexane, was examined in Examples 9 and 10 (Table 2). MPD exposure time was 4 minutes, THFTCC concentration was 0.092 w/v% in hexane and THFTCC exposure time was 25 seconds. The other details of membrane preparation were similar to Examples 1–8. Example 10 can be compared with Example 8 to judge the effect of hexane vs FREON TF.

TABLE 2

| | Examples 9 and 10 | | | |
| EXAMPLE NO. | MDP CONC (%) | SALT REJECTION | FLUX (KW) | FLUX (GFD) |
|---|---|---|---|---|
| 9 | 1.0 | 0.9210 | 1.83 | 10.4 |
| 10 | 1.5 | 0.9522 | 1.70 | 9.6 |

EXAMPLES 11–13

The effect of the addition of a termonomer of lower functionality, namely terephthaloyl chloride (TPC), was examined in Examples 11–13 (Table 3). MPD concentration was 1.0%, MPD exposure time was 4 minutes and THFTCC exposure time was 45 seconds. When TPC was included with THFTCC, both were combined at the indicated levels in a single acyl chloride solution in FREON TF. The other details of membrane preparation were similar to Examples 1–8.

TABLE 3

| | Examples 11–13 | | | | |
| | ACYL CHLORIDE SOLUTION | | | | |
| EXAMPLE NO. | THFTCC CONC (w/v %) | TPC CONC (w/v %) | SALT REJECTION | FLUX (kW) | FLUX (GFD) |
|---|---|---|---|---|---|
| 11 | 0.12 | 0.00 | 0.9695 | 2.42 | 13.9 |
| 12 | 0.09 | 0.03 | 0.9766 | 6.69 | 38.4 |
| 13 | 0.06 | 0.06 | 0.9782 | 6.51 | 37.4 |

The incorporation of the difunctional terephthaloyl chloride in place of part of the tetrahydrofuran-2,3,4,5-tetracarbonyl chloride results in a membrane having excellent flux without sacrificing salt rejection.

EXAMPLES 14–16

Examples 14–16 (Table 4) illustrate the effect of diamines other than MPD, namely para-phenylenediamine (PPD), 4,4'-sulfonyldianiline (SDA) and trans-1,4-cyclohexanediamine (CHD). Amine solution exposure time was 4 minutes and THFTCC solution exposure time was 45 seconds. Other details of membrane preparation were similar to Examples 1–8.

TABLE 4

| | Examples 14–16 | | | |
| EXAMPLE NO. | AMINE TYPE, CONC (%) | THFTCC CONC (w/v %) | SALT REJECTION | FLUX (Kw) | FLUX (GFD) |
|---|---|---|---|---|---|
| 14 | PPD, 1.0 | 0.090 | 0.9330 | 4.53 | 26.0 |
| 15 | SDA, 0.16 | 0.012 | 0.4716 | 9.84 | 59.7 |
| 16 | CHD, 1.0 | 0.104 | 0.4479 | 8.71 | 52.9 |

This use of para-phenylene diamine in place of meta-phenylene diamine provides a membrane having excellent flux and adequate salt rejection for desalinating brackish water.

EXAMPLE 17

Example 17 describes the synthesis of THFTCC. A mixture of 5.0 g of tetrahydrofuran-2,3,4,5-tetracarboxylic acid, 17.3 g of phosphorus pentachloride and 20 ml of benzene was stirred at room temperature under dry nitrogen for 19 hr. The resulting solution was filtered through diatomaceous earth with protection from atmospheric moisture. Solvent removal under reduced pressure at 60° C. yielded 5.07 g (78%) of a pale yellow oil, tetrahydrofuran-2,3,4,5-tetracarbonyl tetrachloride (THFTCC), which began to crystallize upon standing at room temperature.

EXAMPLE 18

Example 18 describes the synthesis of a copolymer of THFTCC with MPD and the solubility characteristics of the copolymer.

A solution of 0.8 g of THFTCC in 4 ml of chloroform was added to a rapidly stirred solution of MPD in water (3%, 100 ml). The resulting polymer powder was filtered, washed with water, acetone and methanol and air-dried. The polymer swelled but did not dissolve in hot N,N-dimethylformamide (DMF) or hot trifluoroacetic acid (TFAA).

EXAMPLE 19

Example 19 describes the synthesis of all-cis cyclopentane-1,2,3,4-tetracarbonyl tetrachloride (CPTC).

A mixture of 2.46 g of all-cis-cyclopentane-1,2,3,4-tetracarboxylic acid, 8.5 g of phosphorous pentachloride and 10 ml of benzene was stirred at reflux under nitrogen for 1.5 hr. The solution was diluted with 10 ml more benzene, heated to reflux and filtered hot through diatomaceous earth. Removal of solvent from the filtrate under reduced pressure yielded 2.85 g (89%) of cyclopentane-1,2,3,4-tetracarbonyl tetrachloride (CPTC) as a yellow solid.

EXAMPLE 20

Example 20 describes the synthesis of a copolymer of CPTC and MPD and the solubility characteristics of the copolymer.

A solution of 0.25 g of CPTC in 20 ml of 1:1 toluene/chloroform was poured into a stirred solution of MPD in water (2.5%, 150 ml). The resulting polymer powder was filtered and washed with water and methanol. The polymer was partly soluble in hot DMF and totally soluble in hot TFAA.

EXAMPLES 21 AND 22

The efficacy of CPTC in the formation of a reverse osmosis membrane with MPD was compared in Examples 21 and 22 (Table 5) with the previous THFTCC examples. CPTC concentration was 0.06 w/v% in F113 and CPTC exposure time was 30 seconds. MPD exposure time was 4 minutes. Other details of membrane preparation were similar to Examples 1-8.

TABLE 5

| | Examples 21 and 22 | | | |
|---|---|---|---|---|
| EXAMPLE NO. | MPD CONC (%) | SALT REJECTION | FLUX (Kw) | FLUX (GFD) |
| 21 | 0.8 | 0.016 | 214 | 701 |
| 22 | 1.2 | 0.008 | 203 | 668 |

Examples 20-22 show that the polymer and membranes based on THFTCC and meta-phenylene diamine is strikingly different than the polymer and membranes based on the corresponding five member hydrocarbon ring compound CPTC with meta-phenylene diamine.

EXAMPLES 23-25

The effect of high pH treatment upon membrane performance was examined in Examples 23-25 (Table 6). MPD concentration was 1.5% and MPD exposure time was 4 minutes. Other details of membrane preparation were similar to Examples 1-8.

The membranes were tested under standard conditions (see "Membrane Testing") for 70 hours. The salt water feed was made basic with sodium hydroxide to pH 10.0 and testing continued for 2 hours. At the end of this time hydrochloric acid was added to the feed reservoir to lower the pH to 6.8 and testing was continued for 20 hours.

TABLE 6

| | Example 23-25 | | | | | |
|---|---|---|---|---|---|---|
| EXAMPLE NO. | THFTCC CONC (w/v %) | THFTCC EXPOSURE TIME (sec) | BEFORE SALT REJECT | pH10 FLUX (Kw) | AFTER SALT REJECT | pH10 FLUX (Kw) |
| 23 | 0.064 | 25 | .9568 | 3.71 | .9690 | 4.35 |
| 24 | 0.104 | 45 | .9791 | 2.63 | .9831 | 3.17 |
| 25 | 0.104 | 25 | .9805 | 2.98 | .9831 | 3.35 |

EXAMPLES 26-28

The effect of aqueous alcohol on membrane performance was examined in Examples 26-28 (Table 7). Membranes were prepared identically to Examples 23, 24 and 25, respectively. Pairs of identical membranes were tested: one membrane of each of the three pairs was mounted in a test cell and 15% aqueous ethanol was circulated through the cell at 80 psig for one hour. The ethanol-treated membranes were then flushed with water for 30 minutes. The ethanol-treated membranes were then tested under standard conditions with salt water feed in parallel with the membranes which had not been ethanol-treated.

TABLE 7

| | Examples 26-28 | | | |
|---|---|---|---|---|
| | NOT ETHANOL-TREATED | | ETHANOL-TREATED | |
| EXAMPLE NO. | SALT REJECTION | FLUX (Kw) | SALT REJECTION | FLUX (Kw) |
| 26 | 0.9568 | 3.71 | 0.9752 | 4.81 |
| 27 | 0.9791 | 2.63 | 0.9849 | 2.31 |
| 28 | 0.9805 | 2.98 | 0.9864 | 3.46 |

We claim:
1. Poly meta-or para-phenylene tetrahydrofuran-2,3,4,5-tetracarboxamide having copolymerized therewith up to 50 mole %, based on tetrahydrofuran-2,3,4,5- tetracarboxamide units, isophthalamide or terephthalamide units.

2. Poly meta-or para-phenylene tetrahydrofuran-2,3,4,5-tetracarboxamide.

3. A multilayer reverse osmosis membrane comprising a microporous support layer and superposed thereon a layer of meta-or para-phenylene tetrahydrofuran-2,3,4,5-tetracarboxamide having copolymerized therewith up to 50 mole %, based on tetrahydrofuran-2,3,4,5-tetracarboxamide, isophthalamide or terephthalamide units.

4. The membrane of claim 3 wherein the superposed polymer layer comprises from 0 to 50 mole %, based on tetrahydrofuran-2,3,4,5-carboxamide units, isophthalamide or terephthalamide units.

5. The membrane of claim 3 wherein the superposed polymer layer is meta-phenylene tetrahydrofuran-2,3,4,5-tetracarboxamide.

* * * * *